United States Patent
Nagami et al.

(10) Patent No.: US 7,660,290 B2
(45) Date of Patent: Feb. 9, 2010

(54) SYSTEM AND METHOD FOR VISUALIZING TRAFFIC AND PATH IN NETWORK

(75) Inventors: Kenichi Nagami, Tokyo (JP); Kuniaki Kondo, Tokyo (JP); Ikuo Nakagawa, Tokyo (JP)

(73) Assignee: Cloud Scope Technologies, Inc., Tokyo (JP)

( * ) Notice: Subject to any disclaimer, the term of this patent is extended or adjusted under 35 U.S.C. 154(b) by 840 days.

(21) Appl. No.: 11/105,356

(22) Filed: Apr. 14, 2005

(65) Prior Publication Data
US 2005/0232230 A1    Oct. 20, 2005

(30) Foreign Application Priority Data
Apr. 16, 2004    (JP)    ............... 2004-121979

(51) Int. Cl.
*H04L 12/28* (2006.01)
(52) U.S. Cl. ................... 370/351; 370/256
(58) Field of Classification Search ........... 370/351, 370/236, 238, 401, 299, 254, 248, 256, 217, 370/230; 709/238, 227
See application file for complete search history.

(56) References Cited

U.S. PATENT DOCUMENTS

| | | | | |
|---|---|---|---|---|
| 4,689,747 | A * | 8/1987 | Kurose et al. ............... | 701/200 |
| 5,721,828 | A * | 2/1998 | Frisch ......................... | 709/217 |
| 5,781,534 | A * | 7/1998 | Perlman et al. ............. | 370/248 |
| 6,078,586 | A * | 6/2000 | Dugan et al. ............. | 370/395.2 |
| 6,262,976 | B1 * | 7/2001 | McNamara .................. | 370/254 |
| 6,396,814 | B1 * | 5/2002 | Iwamura et al. ............. | 370/256 |
| 6,434,478 | B1 * | 8/2002 | Ikeda .......................... | 701/200 |
| 6,601,101 | B1 * | 7/2003 | Lee et al. .................... | 709/227 |
| 6,643,254 | B1 * | 11/2003 | Kajitani et al. .............. | 370/217 |
| 6,728,782 | B1 * | 4/2004 | D'Souza et al. ............. | 709/242 |
| 6,882,653 | B1 * | 4/2005 | Kiuchi et al. ............... | 370/401 |
| 6,976,087 | B1 * | 12/2005 | Westfall et al. ............. | 709/238 |
| 7,110,362 | B2 * | 9/2006 | Kato ........................ | 370/236.1 |
| 7,120,120 | B2 * | 10/2006 | Guerin et al. ............... | 370/238 |
| 7,146,430 | B2 * | 12/2006 | Kobayashi ................... | 709/238 |
| 7,236,455 | B1 * | 6/2007 | Proudler et al. ............. | 370/230 |
| 7,257,221 | B2 * | 8/2007 | Shibao ................... | 379/373.04 |

(Continued)

FOREIGN PATENT DOCUMENTS

JP    5-167582 A    7/1993

(Continued)

*Primary Examiner*—Thong H Vu
(74) *Attorney, Agent, or Firm*—Birch, Stewart, Kolasch & Birch, LLP.

(57) ABSTRACT

Systems and methods for visualizing traffic coming in from outside to a network to be managed and being sent out of the network. An information presentation apparatus acquires traffic information regarding a traffic specified in accordance with a user's instruction, where the traffic information has been collected from one or more routers located at a border of the network to be managed. The apparatus also acquires path information regarding a path from a start router, through which the traffic passes into the network, to an end router, through which the traffic passes out of the network, referring to stored internal path information. The apparatus then informs a user of the acquired traffic information in association with the acquired path information. At least one of specification of the traffic and determination of the end router is performed referring to stored external path information.

20 Claims, 12 Drawing Sheets

U.S. PATENT DOCUMENTS

| | | | |
|---|---|---|---|
| 7,277,386 B1 * | 10/2007 | Ferguson et al. | 370/230 |
| 7,327,748 B2 * | 2/2008 | Montalvo et al. | 370/412 |
| 2002/0055999 A1 | 5/2002 | Takeda | |
| 2004/0170133 A1 * | 9/2004 | Oguchi et al. | 370/299 |
| 2005/0041676 A1 * | 2/2005 | Weinstein et al. | 370/401 |
| 2006/0248220 A1 * | 11/2006 | Funabiki et al. | 709/238 |

FOREIGN PATENT DOCUMENTS

| | | |
|---|---|---|
| JP | 2002-84278 A | 3/2002 |
| JP | 2002-135319 A | 5/2002 |
| JP | 2004-032377 A | 1/2004 |

* cited by examiner

BGP INFORMATION

| ROUTER (R) | ORIGIN AS | PEER AS | PREFIX | NEXT ROUTER (NR) | AS PATH |
|---|---|---|---|---|---|
| A | AS1 | AS2 | Y | D | AS2, AS1 |
| A | AS1 | AS2 | X | D | AS2, AS1 |
| E | AS1 | AS2 | Y | D | AS2, AS1 |
| E | AS1 | AS2 | X | D | AS2, AS1 |
| D | AS3 | AS4 | P | A | AS4, AS3 |
| J | AS3 | AS4 | P | E | AS4, AS3 |
| ⋮ | ⋮ | ⋮ | ⋮ | ⋮ | ⋮ |

*FIG. 2A*

OSPF TOPOLOGY INFORMATION

| LINK | COST |
|---|---|
| A-B | 1 |
| A-F | 5 |
| B-C | 2 |
| C-D | 1 |
| E-F | 1 |
| F-G | 3 |
| G-C | 2 |
| G-H | 3 |
| H-D | 5 |

*FIG. 2B*

OSPF ADDRESS INFORMATION

| ROUTER | CONNECTED ADDRESS (OR PREFIX) |
|---|---|
| D | I |
| ⋮ | ⋮ |

*FIG. 2C*

ROUTER A

| SOURCE PREFIX | DESTINATION PREFIX | TRAFFIC AMOUNT |
|---|---|---|
| P | Y | 20Mbps |
| S | X | 10Mbps |
| ⋮ | ⋮ | ⋮ |

*FIG. 3A*

ROUTER E

| SOURCE PREFIX | DESTINATION PREFIX | TRAFFIC AMOUNT |
|---|---|---|
| Q | Y | 39Mbps |
| T | Y | 20Mbps |
| S | X | 10Mbps |
| ⋮ | ⋮ | ⋮ |

*FIG. 3B*

ROUTER D

| SOURCE PREFIX | DESTINATION PREFIX | TRAFFIC AMOUNT |
|---|---|---|
| Y | S | 20Mbps |
| X | P | 10Mbps |
| ⋮ | ⋮ | ⋮ |

*FIG. 3C*

SYSTEM AND METHOD FOR VISUALIZING TRAFFIC AND PATH IN NETWORK

BACKGROUND OF THE INVENTION

1. Field of the Invention

The present invention relates to a mechanism for, in an internetwork comprising a plurality of networks, visualizing traffic forwarded through a network to be managed, and visualizing a path of the traffic, for a user (e.g., a manager of the network).

2. Background

The Internet, which is a typical internetwork, is a distributed system of autonomous, interconnected networks. Each of many routers (also called nodes) in a network performs a process to receive a packet, determine a next relay node based on a destination of the received packet, and forward the packet to the next relay node, but does not have information about an end-to-end forward path of the packet or about topology of the whole network.

Now, the Internet is generally divided into units called ASs (Autonomous Systems) to be managed. An AS means a group of networks (including routers) operated under a common policy or the same management. For example, an ISP (Internet Service Provider) network corresponds to an AS. AS numbers are used to distinguish ASs from each other.

An independent IGP (Interior Gateway Protocol) can be operated inside each AS, while routing between ASs are performed by an EGP (Exterior Gateway Protocol). OSPF (Open Shortest Path First) and IS-IS (Intermediate System-to-Intermediate System) are typically used as an IGP, and BGP (Border Gateway Protocol) is typically used as an EGP.

Quality control on the Internet, which is an autonomous system distributed as above, is extremely difficult compared to conventional centrally-controlled telephone networks. For quality control, it is important to grasp a state of traffic that flows through a network. In a centrally-controlled circuit switched network, as shown in Japanese Patent Laid-Open Application No. 1993-167582, path data of a call from an originator (source) to a receiver (destination) and network topology data can be acquired in advance. Therefore, the path-by-path traffic volume can be determined by adding up traffic data of each call according to a path of the call, and relation between routing and the traffic volume can be indicated at a glance to a user.

In the Internet, however, since paths and topology of the whole network are not centrally managed as described above, it is difficult to determine the traffic volume by path. For example, Japanese Patent Laid-Open Application No. 2002-84278 describes that a tool called traceroute is used in order to obtain data on a path to a destination. But, since this tool specifies a destination to send a route explorer packet and analyzes a response packet to the explorer packet so as to find a path to the destination, the tool has drawbacks as follows.

First, path exploring cannot be done unless a destination is specified. This is a drawback because it is not practical to use the tool for doing quality control widely in a large-scale network such as the Internet, since path exploring has to be done for every one of all numerous destinations. Moreover, transmission of large amounts of route exploring packets is desired to be avoided since it uselessly increases a network load. The above JP No. 2002-84278 describes that useful destinations may be selected to perform path exploring in order to limit destinations to send a route exploring packet. For example, a plurality of destinations ranked high in traffic volume are selected, or a plurality of destinations ranked low in quality are selected.

However, if the number of path exploring destinations is limited, information on paths and traffic of a network is obtained only partially and locally, and thus it is not realized to grasp an overview of a network and indicate accurate relation between routing and the traffic volume at a glance to a user.

Moreover, by the conventional arts, as is the case with the above JP No. 2002-84278 for example, one point on a connection in the Internet is made to be a traffic monitoring point, and only what amount of traffic is forwarded through what ISP from the monitoring point to each of a plurality of selected destinations can be examined. That is, only a result of so-called "star" type of observation can be obtained for an area from one monitoring point as a center to a plurality of destinations.

In these days when a demand for quality control in the Internet is growing day by day, back data that can be provided by the above conventional arts is insufficient. For example, some ISPs have come to provide a communication quality assurance service called a Service Level Agreement (SLA), and it is urgently required for an ISP manager to design and operate the manager's network so that the manager can assure the quality to an end user. For this purpose, an ISP manager can desirably grasp accurate relation between a path and traffic in the manager's ISP network (own AS) located in the Internet, between any selected points in the manager's network.

SUMMARY OF THE INVENTION

Systems and methods consistent with the invention may provide a mechanism for acquiring information regarding what traffic flows through which path in a network to be managed (e.g., ISP network) that is located in an internetwork comprising a plurality of autonomous networks, and for showing the acquired information as a state of the network in accordance with a request from a user (e.g., an ISP manager).

Systems and methods consistent with the invention may provide an apparatus for an apparatus for visualizing traffic in a network to be managed. The apparatus comprises: a traffic acquiring unit that acquires traffic information, collected from one or more routers located at a border of the network, regarding a traffic specified in accordance with a user's instruction; a path acquiring unit that acquires path information regarding a path from a start router, through which the traffic passes into the network, to an end router, through which the traffic passes out of the network, based on information regarding internal paths in the network; a controlling unit that controls at least one of specification of the traffic and determination of the end router based on information regarding external paths of the network; and an informing unit that informs a user of the traffic information acquired by the traffic acquiring unit in association with the path information acquired by the path acquiring unit.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

FIG. 2A shows an example of information stored in an external path information storage section 120, and FIGS. 2B and 2C show examples of information stored in an internal path information storage section 110;

FIGS. 3A, 3B, and 3C show examples of traffic information collected from each border router A, E, and D, respectively;

DETAILED DESCRIPTION

Figure 1:
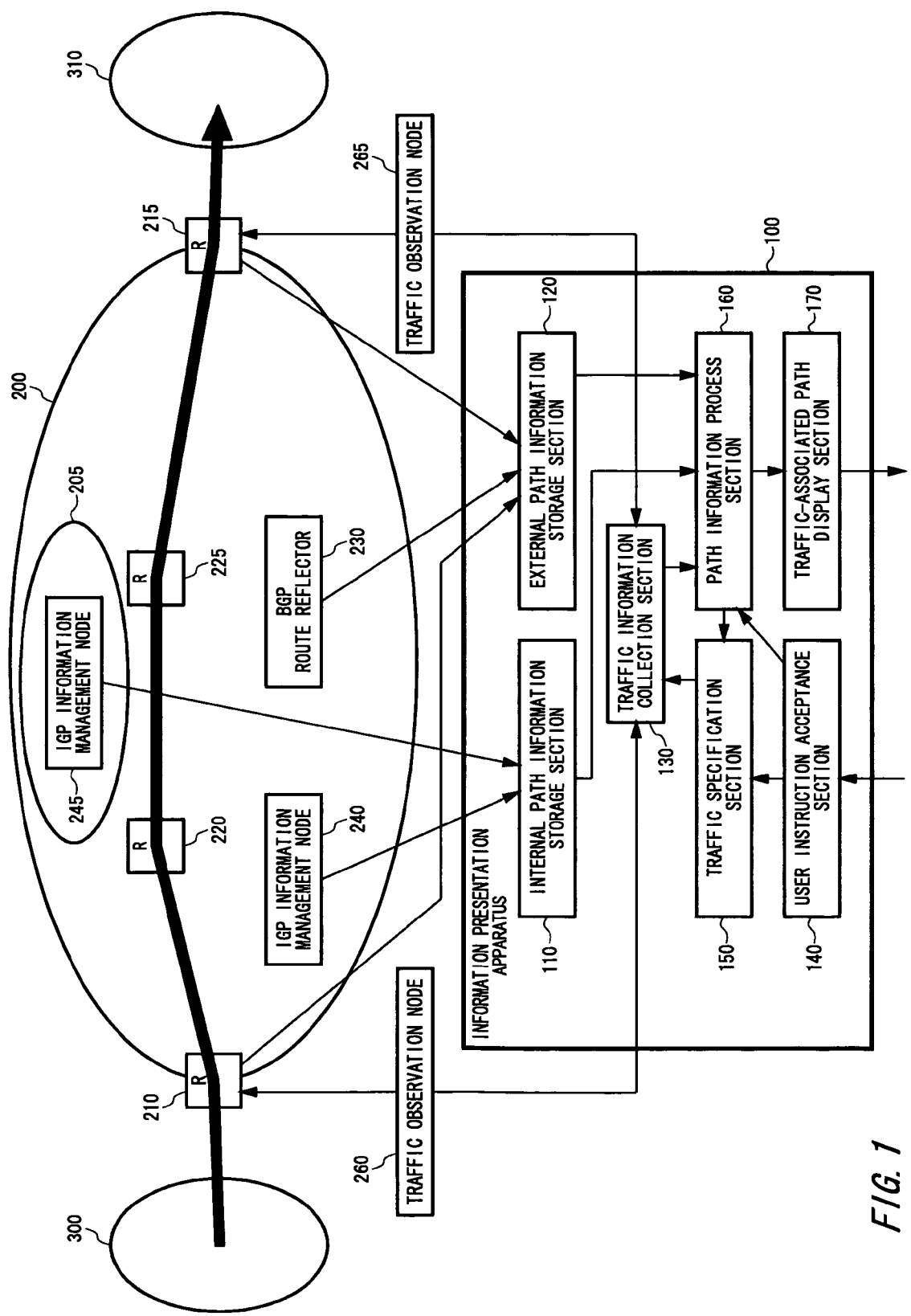
FIG. 1 shows an example of a network configuration to which an embodiment of the invention can be applied, and an example of an internal configuration of an information presentation apparatus consistent with the principle of the invention.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

General Description

A network information presentation apparatus consistent with the invention can visualize traffic in a network to be managed by a user of the apparatus, where the traffic comes into the network and is sent out of the network. Viewed from one aspect, the apparatus may be characterized as follows. That is, the apparatus may comprise a traffic acquiring unit that acquires traffic information regarding a traffic specified in accordance with a user's instruction, where the traffic information has been collected from one or more routers located at a border of the network. The apparatus may further comprise a path acquiring unit that acquires path information regarding a path from a start router, through which the traffic passes into the network, to an end router, through which the traffic passes out of the network, based on information regarding internal paths in the network. The apparatus may still further comprise a controlling unit that controls at least one of specification of the traffic and determination of the end router based on information regarding external paths of the network, and an informing unit that informs a user of the traffic information acquired by the traffic acquiring unit in association with the path information acquired by the path acquiring unit.

In this configuration, relation between a path and traffic, for example, what path is used in a network to be managed (e.g., an AS) to forward traffic when the traffic passes through the network, can be clearly shown to a user, where the traffic is forwarded end-to-end through an internetwork including the network. This can be performed by using information about an internal path inside the network (e.g., IGP information), information about an external path outside the network (e.g., an EGP information), traffic information collected from routers at a border of the network, and a user's instruction, in combination.

Here, internal path information (e.g., OSPF information, IS-IS information, etc.) and external path information (e.g., BGP information etc.) in the internetwork are used in combination in order to specify traffic and find the traffic's path in accordance with a user's instruction. Therefore, path information that matches a user's request can be acquired without path exploring that increases a load of the network. Moreover, since the path information used in combination as above is not so limited information as in path exploring but general information, information can be acquired for all traffic that passes through a certain path. Furthermore, for example, in a case where there are a plurality of paths from one point to another point and even traffic to the same destination is divided among the plurality of paths to be forwarded, path exploring can find only one of the paths, whereas the plurality of paths can be found based on the internal path information.

In some cases, an exit router (or egress router) of the network to be managed may correspond to an end router described herein, and in other cases, an entry router (or ingress router) of a network next to the network to be managed may correspond to an end router described herein. A start router described herein can be a router located at a border of the network to be managed (e.g., AS), where another AS may exist outside the border of the AS or a user network or user node accommodated by the AS itself may exist outside the border of the AS.

Viewed from another aspect, a network information presentation apparatus consistent with the invention may be characterized as follows. That is, the apparatus may comprise: a specifying unit that determines specification information for specifying a traffic in accordance with a user's instruction, and a traffic acquiring unit that acquires traffic information regarding the traffic specified by the specification information, where the traffic information has been collected from one or more routers located at a border of the network. The apparatus may further comprise a determining unit that determines a start router, through which the traffic passes into the network, and an end router, through which the traffic passes out of the network. The apparatus may still further comprise a path acquiring unit that acquires path information regarding an internal path of the network from the start router to the end router, and an informing unit that informs a user of the traffic information acquired by the traffic acquiring unit in association with the path information acquired by the path acquiring unit.

In the above configuration, the specification information may include at least one of a destination network address and a source network address of the traffic, and the determining unit may determine that a router from which traffic information regarding the traffic specified by the specification information is collected is the start router, and may determine the end router based on the destination network address of the traffic. A prefix (represented by a predetermined number of the highest bits of a node address), for example, corresponds to the network address here. In this configuration, for example, by designating at least one of a destination network address and a source network address, a user can view a path displayed regarding traffic specified by the designation.

In the above configuration, the apparatus may further comprise a storing unit that stores external information regarding external paths of the network, wherein the determining unit may determine the end router based on a destination network address of the traffic, referring to the external information stored by the storing unit. In this configuration, an end router, through which traffic passes in order to flow out of the network and to reach a certain destination network address, can be found based on the external path information (e.g., information on next routers in BGP), so that an internal path to the end router can be acquired.

In the above configuration, the apparatus may further comprise a storing unit that stores external information regarding external paths of the network, wherein the specifying unit may include a unit that determines one or more destination or source network addresses based on a destination or source network management number designated by the user, referring to the external information stored by the storing unit. An AS number, for example, corresponds to the network management number here. In this configuration, for example, by designating at least one of a destination network management number and a source network management number, a user can view a path displayed regarding traffic specified by the designation.

In the above configuration, the apparatus may further comprise a storing unit that stores external information regarding external paths of the network, wherein the specifying unit may include a unit that determines one or more network addresses based on a peer network management number designated by the user, referring to the external information stored by the storing unit. The term peer refers to, for example, a neighboring router or neighboring network with which BGP information is directly exchanged. In this configuration, for example, by designating a peer network management number, a user can view a path displayed regarding traffic specified by the designation.

In the above configuration, the specifying unit may include a unit that determines an end router in accordance with the user's instruction, and may determine, as the specification information, a destination network address registered corresponding to the end router in said one or more routers, and the determining unit may determine that a router which registers the destination network address determined as the specification information is the start router, and may determine that the end router determined by the specifying unit is the end router. In this configuration, for example, by designating an address of a peer network (may be a peer router address or may be a peer network prefix) with which an end router is connected, a user can view a path displayed regarding traffic specified by the designation.

In the above configuration, the apparatus may further comprise a storing unit that stores external information regarding external paths of the network, wherein the specifying unit may include a unit that determines a destination network address corresponding to the end router, referring to the external information stored by the storing unit. In this configuration, a destination network address, for which traffic that passes through a certain end router and flows out of the network to be managed is destined, can be found based on the external path information (e.g., information on next routers in BGP), so that corresponding traffic information can be acquired.

In the above configuration, the apparatus may further comprise a storing unit that stores internal information regarding internal paths of the network, wherein the specifying unit may include a unit that determines an end router such that a router having an address designated by the user as the router's connected address is the end router, referring to the internal information stored by the storing unit. In this configuration, when a user, for example, designates a peer network address, an end router with which the peer network is connected can be determined based on the internal path information (e.g., information on addresses to which each router is connected in OSPF).

In the above configuration, the apparatus may further comprise a storing unit that stores internal information regarding internal paths of the network, wherein the path acquiring unit may acquire the path information regarding a path from the start router to the end router, referring to the internal information stored by the storing unit. In this configuration, if a start router and an end router are determined, a path between them can be determined using the internal path information (e.g., OSPF or IS-IS topology information).

Viewed from still another aspect, a network information presentation apparatus consistent with the invention may be characterized as follows. That is, the apparatus may comprise a path acquiring unit that acquires path information regarding at least one path passing through a router or a link between routers designated by a user inside the network, and a determining unit that determines a start router and an end router, both of which are located at a border of the network, for each of said at least one path. The apparatus may further comprise a specifying unit that determines specification information for specifying a traffic based on the end router determined by the determining unit, and a traffic acquiring unit that acquires traffic information regarding the traffic specified by the specification information, where the traffic information has been collected from the start router determined by the determining unit. The apparatus may still further comprises an informing unit that informs a user of the traffic information acquired by the traffic acquiring unit in association with the path information acquired by the path acquiring unit. In this configuration, for example, by designating a router or link in a network to be managed, a user can view a path displayed regarding traffic specified by the designation.

In the above configuration, the apparatus may further comprise a storing unit that stores internal information regarding internal paths of the network, wherein the path acquiring unit may acquire the path information, referring to the internal information stored by the storing unit, and the determining unit may determine the start router and the end router, referring to the internal information stored by the storing unit. In this configuration, if a router or link is designated by a user, a start router, an end router, and also a path between them can be determined using the internal path information (e.g., OSPF or IS-IS topology information).

In the above configuration, the apparatus may further comprise a storing unit that stores external information regarding external paths of the network, wherein the specifying unit may determine, as the specification information, a destination network address registered corresponding to the end router in the start router, referring to the external information stored by the storing unit. In this configuration, a destination network address, for which traffic that passes through a certain end router and flows out of the network to be managed is destined, can be found based on the external path information (e.g., information on next routers in BGP), so that corresponding traffic information can be acquired.

The above-described network information presentation apparatus may further comprise an accepting unit that accepts designation of a start router from the user, wherein the traffic acquiring unit may acquire the traffic information by collecting the traffic information from the start router designated via the accepting unit by the user, and the determining unit may determine the start router in accordance with the user's designation via the accepting unit. This allows a user to additionally designate a start router and thus limit the number of paths to be displayed in association with traffic.

A network information presentation method consistent with the invention can visualize traffic in a network to be managed by a user of the method, where the traffic comes into the network and is sent out of the network. One method consistent with the invention may comprise: determining specification information for specifying a traffic in accordance with a user's instruction; acquiring traffic information regarding the traffic specified by the specification information, the traffic information being collected from one or more routers located at a border of the network; determining a start router, through which the traffic passes into the network, and an end router, through which the traffic passes out of the network; acquiring path information regarding an internal path of the network from the start router to the end router; and informing a user of the traffic information in association with the path information.

Another method consistent with the invention may comprise: determining an end router in accordance with a user's instruction; determining specification information for specifying a traffic, the specification information being registered corresponding to the end router by one or more routers located at a border of the network; acquiring traffic information regarding the traffic specified by the specification information, the traffic information being collected from said one or more routers; acquiring path information regarding an internal path of the network from a start router to the end router, the start router being said one or more routers; and informing a user of the traffic information in association with the path information.

Still another method consistent with the invention may comprise: acquiring path information regarding at least one path passing through a router or a link between routers designated by a user inside the network; determining a start router and an end router for each of said at least one path, the start router and the end router being located at a border of the network; determining specification information for specifying a traffic based on the end router; acquiring traffic information regarding the traffic specified by the specification information, the traffic information being collected from the start router; and informing a user of the traffic information in association with the path information.

The above network information presentation apparatus may be realized by a program that makes a computer function as the apparatus, and the above network information presentation method may be realized by a program that makes a computer execute the method, said programs being stored on a computer readable medium.

Description with Reference to Drawings

Exemplary embodiments of the above-described configuration will be described below with reference to the drawings.

FIG. 1 shows an exemplary network configuration to which an embodiment of the invention can be applied. A home AS (Autonomous System) 200 is a network to be managed, and traffic from another network 300 to another network 310 passes through the home AS 200. The networks 300 and 310 may be other ASs, or user networks accommodated in the home AS, or user nodes. A router 210 is a router located at a border between the network 300 and the home AS 200, and a router 215 is a router located at a border between the network 310 and the home AS 200. For traffic shown by an arrow, the router 210 becomes a start router and the router 215 becomes an end router. The traffic shown by the arrow is forwarded through the home AS 200 via routers 220 and 225.

The home AS 200 may be divided into a plurality of areas so as to be managed, and one of the areas is shown as 205. OSPF, IS-IS, or other routing information inside the AS is managed by IGP information management nodes 240 and 245. An IGP information management node may be provided for each and every area. In order to improve reliability of the network, more than one identical IGP information management nodes may be provided for each area for redundancy's sake. BGP or other routing information between ASs is stored in the border routers 210 and 215, which are BGP speakers. A BGP route reflector 230 that exchanges BGP information for a plurality of border routers may be provided somewhere in the home AS 200.

An exemplary internal configuration of an information presentation apparatus 100 consistent with the embodiment is also shown in FIG. 1. The information presentation apparatus 100 is connected to the home AS 200, and comprises an internal path information storage section 110, an external path information storage section 120, a traffic information collection section 130, a user instruction acceptance section 140, a traffic specification section 150, a path information process section 160, and a traffic-associated path display section 170. In FIG. 1, an example is shown in which traffic observation nodes 260 and 265 for observing traffic flowing into the home AS 200 through the border routers 210 and 215, respectively, are provided separately from the information presentation apparatus 100, and in which the traffic information collection section 130 collects traffic observation results from the traffic observation nodes 260 and 265. Alternatively, the function of the traffic observation nodes 260 and 265 can be incorporated in the information presentation apparatus 100. Each section that the information presentation apparatus 100 comprises may be actualized by software, hardware, or combination of them.

The traffic observation nodes 260 and 265 use, for example, NetFlow (a technology of Cisco Systems, Inc.) or sFlow (a technology of InMon corporation) in order to observe the amount of traffic forwarded from the border routers 210 and 215, respectively, into the home AS. These technologies allows traffic information to be collected using a destination prefix and/or source prefix as a key, so that information on traffic coming in from each border router (traffic whose start router in the home AS 200 is each border router) is stored in the traffic information collection section 130. An address or port number, which defines traffic more specifically than a prefix, may be used as a key for collecting traffic information as required.

The external path information storage section 120 stores BGP information, for example, as shown in FIG. 2A. FIG. 2A is BGP information collected in a case where a network configuration is as shown in FIGS. 5 to 8, and is a set of BGP information that is stored in each of border routers A, E, D, and J. Each piece of BGP information may be sent from the border routers A, E, D, and J (210 and 215 in FIG. 1) severally to the information presentation apparatus 100, or the whole BGP information may be provided collectively from the BGP route reflector 230 to the information presentation apparatus 100.

According to the BGP information in FIG. 2A, it can be seen that an AS called AS1 has prefixes X and Y and that an AS called AS3 has a prefix P, referring to origin AS information. It can also be seen that traffic passes through AS2 to reach from the home AS to prefixes X and Y of AS1 and that traffic passes through AS4 to reach from the home AS to the prefix P of AS3, referring to AS path information. According to AS path information, all ASs through which traffic reaches from the home AS to an origin AS are determined in order of passage, and a first AS of the determined ASs will be a peer AS (AS adjacent to the home AS). The peer AS may be virtually adjacent to the home AS, where physically one or more other networks may exist between the home AS and the peer AS.

In addition, according to the BGP information in FIG. 2A for each router (R), it can be seen that the next router (NR) for traffic forwarded from the router A to the prefixes X and Y is D, that the next router (NR) for traffic forwarded from the router E to the prefixes X and Y is also D, that the next router (NR) for traffic forwarded from the router D to the prefix P is A, and that the next router (NR) for traffic forwarded from the router J (not shown) to the prefix P is E (which is different from the next router for traffic forwarded from the router D to the same prefix). D, A, and E registered as next routers are also border routers in the home AS. FIGS. 5 to 8 illustrate a case where D registered as a next router is an exit router of the home AS. Alternatively, a next router registered in BGP information may be an entry router of an AS to which the exit router of the home AS is connected. This is because correspondence between an exit router of the home AS and an entry router of the next AS can be found from IGP information described below.

Figure 10:
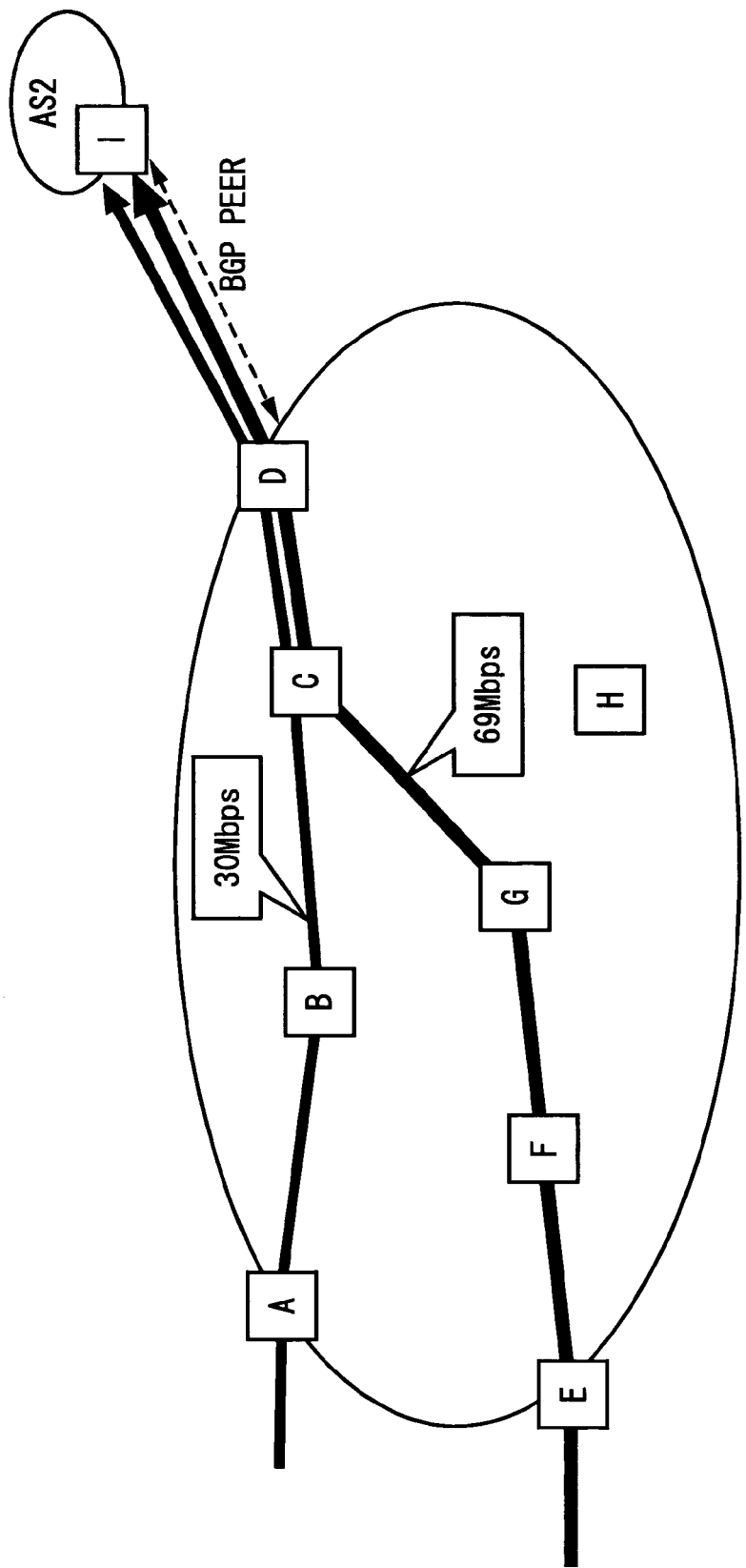
FIG. 10 shows an example of information shown to a user by the information presentation apparatus in a case where a peer AS number or a peer address is designated.

The internal path information storage section 110 stores IGP information, for example, as shown in FIGS. 2B and 2C. The following description takes OSPF as an example of IGP, but similar implementation can be made for a case where IS-IS is used. Since OSPF is a link state protocol, topology information is obtained and stored as FIG. 2B. That is, a couple of routers between which a link exists in the home AS are registered, and the cost of the link (how hard it is for traffic to pass through) is also entered. If a start router and an end router are determined in the home AS, a path between them can be calculated from this OSPF topology information so that, for example, the total cost is minimized. In addition, OSPF address information is stored as FIG. 2C. OSPF address information indicates an address or prefix which is connected with a certain router. If the network configuration is shown in FIG. 10, OSPF address information shows that the router D is connected to an address of the router I.

The traffic information collection section 130 stores traffic information, for example, as shown in FIGS. 3A to 3C. A traffic amount (unit: bps) is collected here for every source and destination prefix of each of the border routers (start routers) A, E, and D. In a case where a border router (start router) has a plurality of network I/Fs, traffic information is collected for each I/F.

A user of the information presentation apparatus 100 (e.g., a manager of the AS 200) can give various instructions to the user instruction acceptance section 140, to examine, for example, traffic heading to a certain destination, traffic sent from a certain source, traffic passing through a certain router or link, traffic that uses a certain peer network, or the like. Each of a destination, source, and peer can be specified by designating a prefix, address, or AS number. If a user's designation accepted by the user instruction acceptance section 140 as above can directly specify traffic information stored in the traffic information collection section 130, traffic information is immediately specified via the traffic specification section 150. If a user's designation requires analysis, traffic information is specified via the traffic specification section 150 after the path information process section 160 creates information for specifying traffic, referring to the path information storage sections 110 and 120.

Traffic information specified as above is read from the traffic information collection section 130 and thus obtained by the path information process section 160. The path information process section 160 further obtains path information on the traffic referring to the path information storage sections 110 and 120, visualizes a path of traffic passing through the home AS, and shows the result to a user via the traffic-associated path display section 170. For this purpose, the information presentation apparatus 100 may have a display, or the information presentation apparatus may be able to be connected with a plurality of client nodes (not shown) via a network so that the result is shown on displays of the client nodes in accordance with an instruction by a user of each client node. There is one information presentation apparatus in the example of FIG. 1, but alternatively a plurality of information presentation apparatus may be installed in a plurality of locations in the network 200 so that information is exchanged and shared between the information presentation apparatuses. In such a case, for example, an information presentation apparatus closest to a client node that requests a visualization service will show visualized information in response to a user's designation.

There may be various visualizing methods as follows: indicating a path by an arrow and then popping up the amount of traffic flowing through the path when the arrow is clicked; changing the line thickness of the arrow depending on the traffic volume; altering the color of the arrow when the traffic amount is beyond a threshold; or the like. In a case where there are N paths (N: natural number greater than one) from the same start router to the same end router for multipath load distribution, the traffic volume obtained for one destination prefix may be divided into N equal parts to be displayed.

Figure 4:
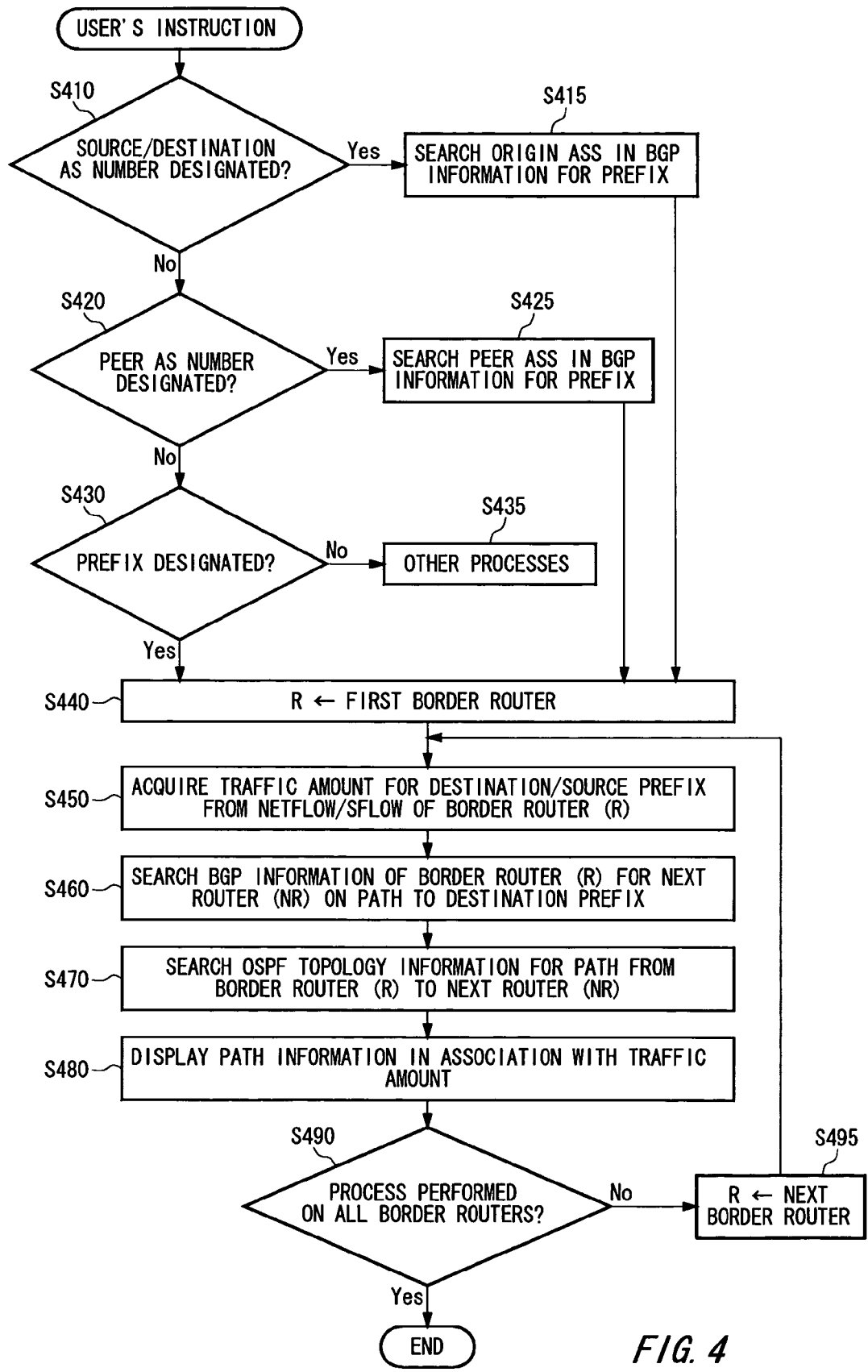
FIG. 4 is a flowchart that shows an example of a process in the information presentation apparatus consistent with the principle of the invention.

FIG. 4 illustrates in detail an exemplary process performed by the above information presentation apparatus 100. First, a case will be described where a source AS number and/or a destination AS number are specified by a user's designation (S410 Yes). When a source AS number is designated, a prefix that matches the designated source AS number is searched for, using an origin AS number in the BGP information in FIG. 2A as a key. The found prefix is a source prefix (S415). When a destination AS number is designated, a prefix that matches the designated destination AS number is searched for, using an origin AS number in the BGP information in FIG. 2A as a key. The found prefix is a destination prefix (S415).

Then, the following process is performed on all the border routers (R) of the home AS for the retrieved source and/or destination prefixes (steps after S440 are repeated via S495 until the answer of S490, in which whether the process is done for all the border routers or not is asked, becomes Yes). First, the traffic information collected using NetFlow/sFlow shown in one of FIGS. 3A to 3C, which corresponds to a border router (R) to be currently processed, is referred to, and if there is a traffic amount corresponding to the retrieved destination prefix and/or source prefix, the traffic amount is acquired (S450). When there is a corresponding traffic amount, BGP information of the border router (R) to be currently processed, among the BGP information in FIG. 2A, is also searched for a BGP next router (NR) on a path to the destination prefix (S460). The retrieved next router, which may be converted to an exit router of the home AS when an entry router of the next AS is retrieved, is an end router. Then, the OSPF topology information in FIG. 2B is searched for information on a path from the border router (R) to be currently processed to the next router (NR) (S470). Finally, the retrieved path information is displayed in association with the acquired traffic amount (S480). Since one traffic amount is for each prefix, traffic amounts are added up for the same path. This total represents a traffic amount for the designated AS number.

Figure 5:
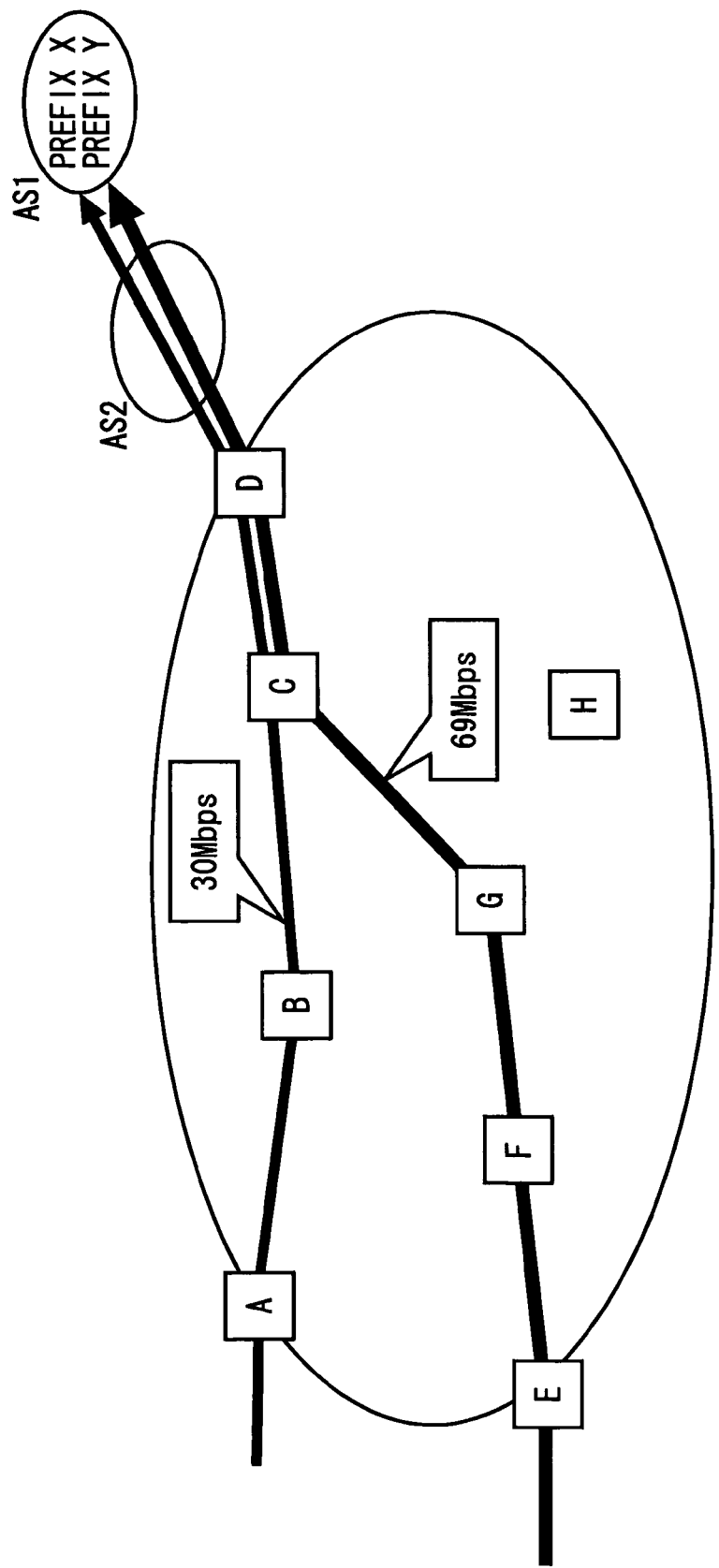
FIG. 5 shows an example of information shown to a user by the information presentation apparatus in a case where a destination AS number is designated.

As a concrete example, a case will be described in accordance with a display example in FIG. 5, where a user specifies that a destination AS number is AS1. To begin with, by searching the BGP information in FIG. 2A for a prefix whose origin AS is AS1, X and Y are obtained. These are destination prefixes.

First, all the border routers A, E, and D are examined for the retrieved destination prefix X. By acquiring traffic amounts corresponding to the destination prefix X and any source prefix from the NetFlow/sFlow information in FIGS. 3A, 3B and 3C, it can be seen that the traffic amounts are 10 Mbps for the router A, 10 Mbps for the router E, and 0 Mbps for the router D, since there is no entry in the router D. By searching the BGP information on the routers A and E, in which there is an entry, for a BGP next router to the destination prefix X, it can be seen that the next router is D. Then, by searching the OSPF information in FIG. 2B for information on a path from the router A to the next router D, a path passing through the routers A, B, C, and D in this order can be obtained. Similarly, by searching the OSPF information for information on a path from the router E to the next router D, a path passing through the routers E, F, G, C, and D in this order can be obtained. After all, association of the traffic amount with each piece of the path information is as follows: 10 Mbps for the path from the router A to D, and 10 Mbps for the path from the router E to D.

Next, an examination is similarly performed on all the border routers A, E, and D for the retrieved destination prefix Y. By acquiring traffic amounts corresponding to the destination prefix Y and any source prefix from the NetFlow/sFlow information in FIGS. 3A, 3B, and 3C, a traffic amount of 20 Mbps can be obtained for the router A, and a traffic amount of 59 Mbps, which is the sum of 39 Mbps from a source prefix Q and 20 Mbps from T, can be obtained for the router E. There is no corresponding entry in the router D. By searching the BGP information on the routers A and E, in which there is an entry, for a BGP next router to the destination prefix Y, it can be seen that the next router is D. Then, by searching the OSPF information in FIG. 2B for information on a path from the router A to the next router D, a path passing through the routers A, B, C, and D in this order can be obtained. Similarly, by searching the OSPF information for information on a path from the router E to the next router D, a path passing through the routers E, F, G, C, and D in this order can be obtained. After all, association of the traffic amount with each piece of the path information is as follows: 20 Mbps for the path from the router A to D, and 59 Mbps for the path from the router E to D.

Then, by adding the traffic amount for the destination prefix X and the traffic amount for the destination prefix Y for the same path, 10+20=30 Mbps is obtained for the path from the router A to the router D, and 10+59=69 Mbps is obtained for the path from the router E to the router D. The example in FIG. 5 displays each of the paths together with the traffic amounts determined as above. Displayed in FIG. 5 are not only the paths in the home AS, but also the designated destination AS number (AS1) and the retrieved destination prefixes (X and Y). Moreover, the number of a transit AS (AS2), which can be found from the AS path in the BGP information in FIG. 2A, may also be displayed.

Figure 6:
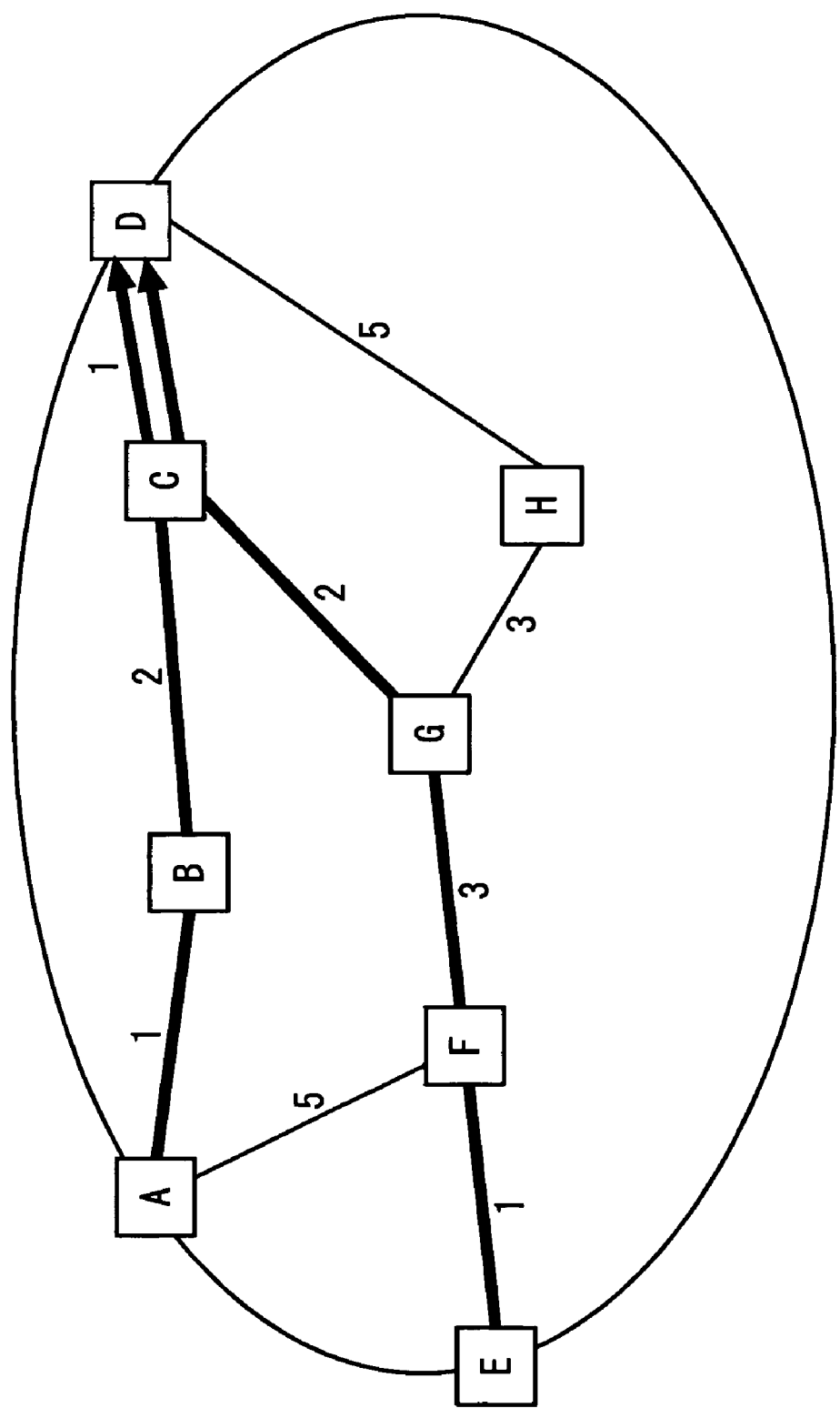
FIG. 6 shows an example of detailed information shown to a user by the information presentation apparatus consistent with the principle of the invention.

FIG. 6 is an example where paths in the home AS are displayed in detail with the OSPF topology information in FIG. 2B. In FIG. 6, a path from the router A to D and a path from the router E to D are calculated by a shortest path search (e.g., Dijkstra's algorithm) as follows. Costs, which indicate how hard it is for traffic to pass through, are set up for links between routers, and a path is searched for so that the cost is minimized. As for a path from the router A to D, a path from A through B through C to D makes the total cost of 1+2+1=4, which is smaller than any other path. As for a path from the router E to D, a path from E through F through G through C to D makes the total cost of 1+3+2+1=7, which is smaller than any other path. Described here are examples where one path having the smallest cost is determined, but if there are a plurality of paths that have the smallest cost, all the paths are displayed. This is called equal-cost multipath.

As another concrete example, a case will be described in accordance with a display example in FIG. 7, where a user specifies that a source AS number is AS3. To begin with, by searching the BGP information in FIG. 2A for a prefix whose origin AS is AS3, P is obtained, which is a source prefix. All the border routers A, E, and D are examined for the retrieved source prefix P. By acquiring destination prefixes and traffic amounts corresponding to the source prefix P from the NetFlow/sFlow information in FIGS. 3A, 3B, and 3C, it can be seen that they are the destination prefix Y and 20 Mbps for the router A. It can also be seen that there is no traffic whose source prefix is P, for the routers E and D. By searching the BGP information on the router A, in which there is an entry, for a BGP next router to the destination prefix Y, it can be seen that the next router is D. Then, by searching the OSPF information in FIG. 2B for information on a path from the router A to the next router D, a path passing through the routers A, B, C, and D in this order can be obtained. After all, association of the traffic amount with the path information is: 20 Mbps for the path from the router A to D.

Figure 7:
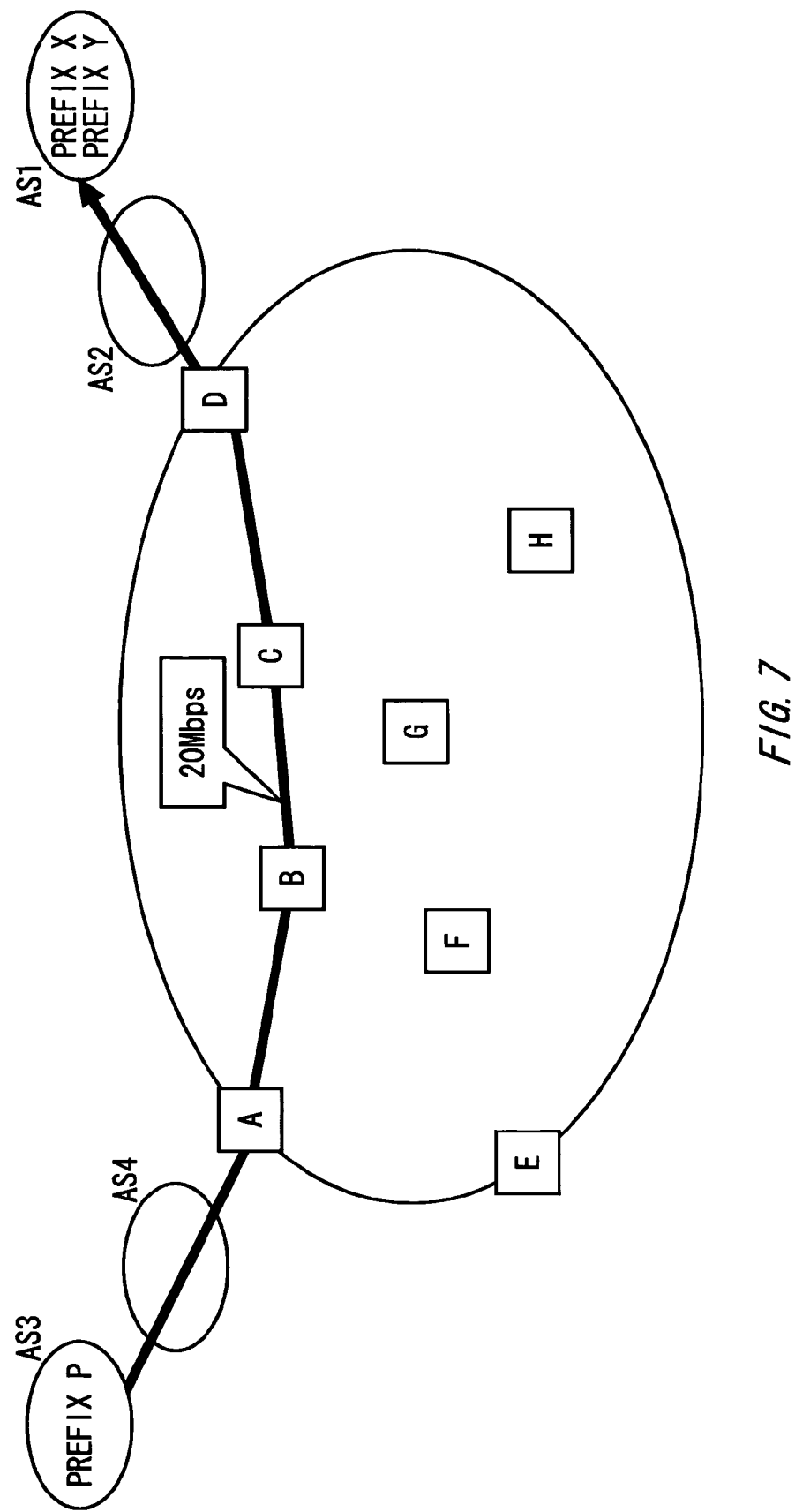
FIG. 7 shows an example of information shown to a user by the information presentation apparatus in a case where a source AS number is designated.

An example in FIG. 7 displays the path together with the traffic amount determined as above. Displayed in FIG. 7 are not only the path in the home AS (from A through B through C to D) and its traffic (20 Mbps), but also the designated source AS number (AS3) and the retrieved source prefix (P). Moreover, the number of a transit AS (AS4), which can be found from the AS path in the BGP information in FIG. 2A, may also be displayed. Additionally, the destination prefix (Y) of traffic, which is obtained from the NetFlow/sFlow information in FIG. 3A, may be displayed. Furthermore, an AS number (AS1) corresponding to the prefix Y, another prefix X that the AS (AS1) has, and information on an AS (AS2) through which traffic passes to the AS (AS1) may be determined and displayed as well.

Figure 8:
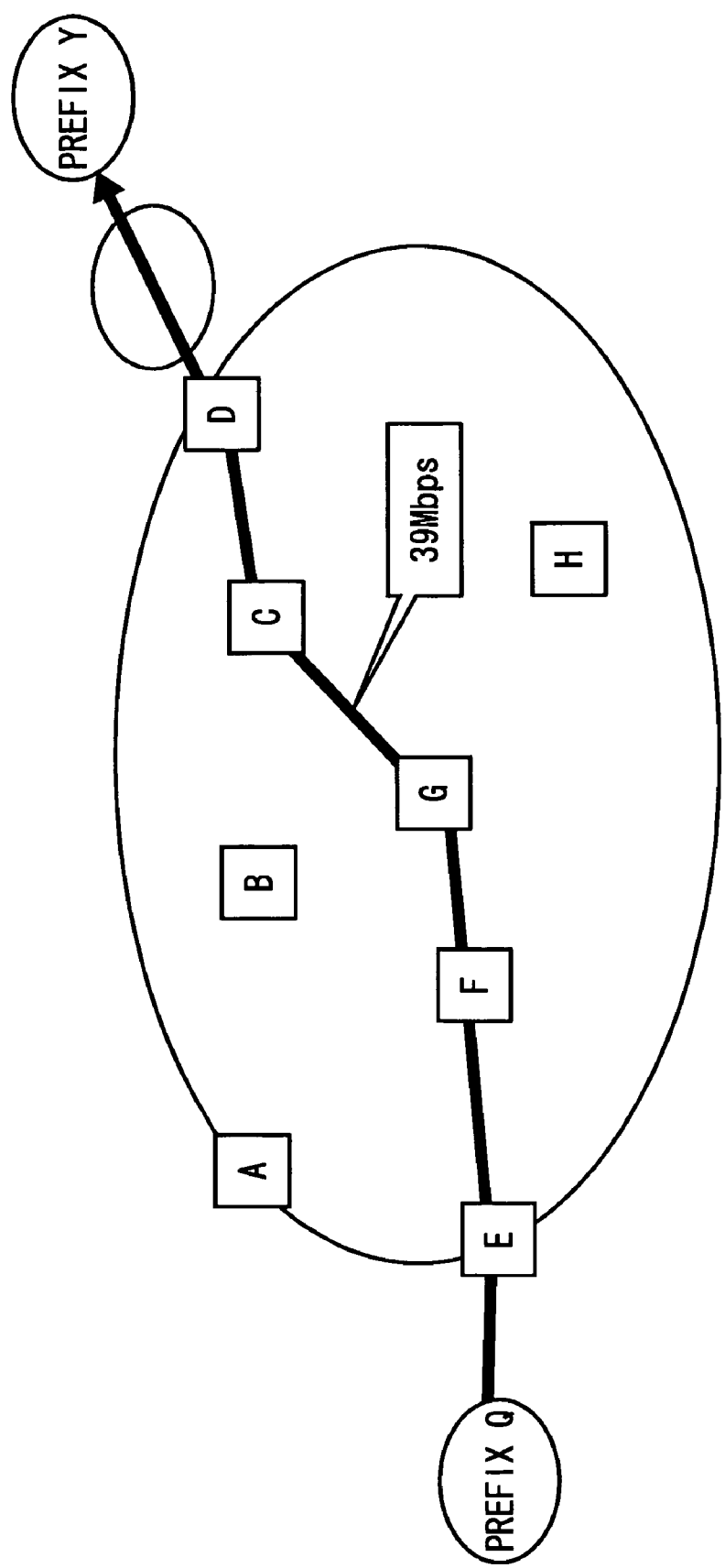
FIG. 8 shows an example of information shown to a user by the information presentation apparatus in a case where source and destination prefixes are designated.
Figure 11:
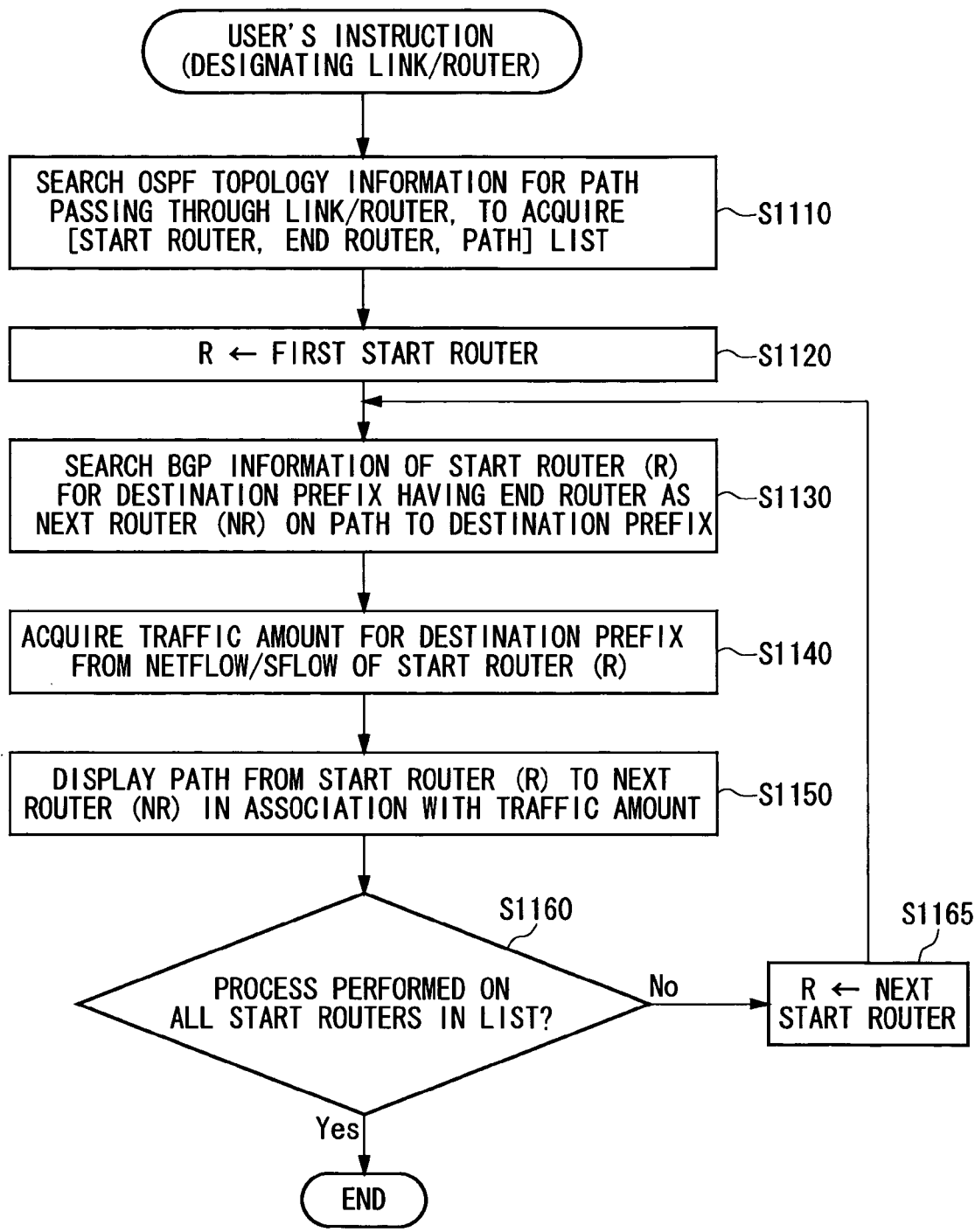
FIG. 11 is a flowchart that shows still another example of a process in the information presentation apparatus consistent with the principle of the invention.

FIG. 8 is a display example where a user's instruction is made to designate a certain destination prefix and source prefix. In this case, according to the process flow shown in FIG. 4, the process directly (S430 Yes) enters the loop (after S440) to perform steps S450 to S480 on all the border routers. In FIG. 4, if a user's instruction is not designation of a source/destination AS number, of a peer AS number, or of a source/destination prefix (S430 No), the process goes to other processes (S435), in which a process in FIG. 9 and a process in FIG. 11 may be included. The process in FIG. 9 shows a case where a user's instruction is designation of a peer address, and the process in FIG. 11 shows a case whereas user's instruction is designation of a link or router.

In the example in FIG. 8, a user specifies that a source prefix is Q and a destination prefix is Y. In this case, by searching the NetFlow/sFlow information on all the border routers A, E, and D in FIGS. 3A, 3B, and 3C for traffic whose destination prefix is Y and source prefix is Q, it can be seen that there is corresponding traffic only in the router E and the amount of the traffic is 39 Mbps. By searching the BGP information on the router E, in which there is an entry, for a BGP next router to the destination prefix Y, it can be seen that the next router is D. Then, by searching the OSPF information in FIG. 2B for information on a path from the router E to the next router D, a path passing through the routers E, F, G, C, and D in this order can be obtained. After all, association of the traffic amount with the path information is: 39 Mbps for the path from the router E to D.

Figure 9:
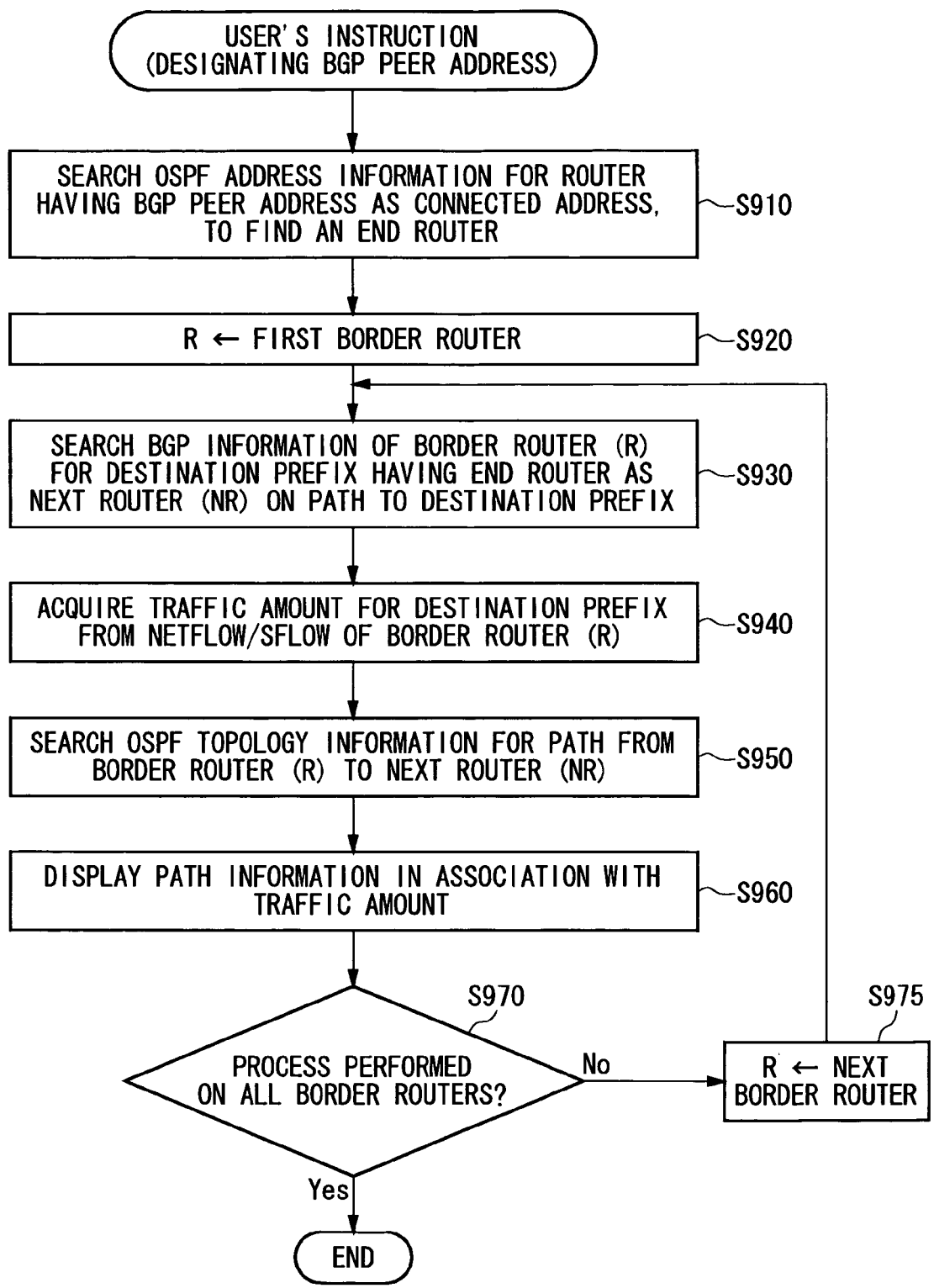
FIG. 9 is a flowchart that shows another example of a process in the information presentation apparatus consistent with the principle of the invention.

FIG. 9 shows an exemplary process performed by the information presentation apparatus 100 in a case where a BGP peer address is designated by a user. To begin with, the OSPF address information in FIG. 2C is searched for a router whose connected address is the designated BGP peer address. The retrieved router is determined as an end router (S910). Then, the following process is performed on all the border routers (R) of the home AS for the determined end router (steps after S920 are repeated via S975 until the answer of S970, in which whether the process is done for all the border routers or not is asked, becomes Yes).

First, among the BGP information shown in FIG. 2A, BGP information of a border router (R) to be currently processed is examined to see if there is an entry whose next router (NR) is identical to the end router determined above. If there is the same router, a destination prefix stored corresponding to the next router (NR) is acquired (S930). As for the border router (R) having the above entry including the determined end router as the next router, the traffic information collected using NetFlow/sFlow shown in a corresponding one of FIGS. 3A to 3C is referred to, and if there is a traffic amount corresponding to the acquired destination prefix, the traffic amount is acquired (S940). Then, the OSPF topology information in FIG. 2B is searched for information on a path from the border router (R) to be currently processed to the next router (NR) (S950). Finally, the retrieved path information is displayed in association with the acquired traffic amount (S960). Since one traffic amount is for each prefix, traffic amounts are added up for the same path. This total represents a traffic amount for the designated peer address.

As a concrete example, a case will be described in accordance with a display example in FIG. 10, where a user specifies that a BGP peer address is I. To begin with, by searching the OSPF address information in FIG. 2C for a router having the designated BGP peer address I as a connected address, the router D is obtained. This is an end router. Then, all the border routers A, E, and D are examined as follows. By searching the BGP information in FIG. 2A on each border router for an entry whose next router is identical to the end router D, destination prefixes X and Y are obtained. Then, by acquiring traffic amounts corresponding to the destination prefix X and any source prefix from the NetFlow/sFlow information in FIGS. 3A and 3C, 10 Mbps is obtained for the router A and 10 Mbps is obtained for the router E; and by acquiring traffic amounts corresponding to the destination prefix Y and any source prefix, 20 Mbps is obtained for the router A and 59 Mbps is obtained for the router E. There is no registration of the router D as a next router in the BGP information on the router D, so NetFlow/sFlow information for the router D is 0 Mbps.

Then, by searching the OSPF information in FIG. 2B for information on a path from the router A to the next router D, a path passing through the routers A, B, C, and D in this order can be obtained. Similarly, by searching the OSPF information for information on a path from the router E to the next router D, a path passing through the routers E, F, G, C, and D in this order can be obtained. After all, association of the traffic amount with each piece of the path information is as follows: 10+20=30 Mbps for the path from the router A to D, and 10+59=69 Mbps for the path from the router E to D.

In a case where a BGP peer AS number is designated by a user, an exemplary process performed by the information presentation apparatus 100 is as shown in FIG. 4. That is, if a peer AS number is specified by a user's designation (S420 Yes), prefixes that match the designated AS number are thoroughly searched for, using a peer AS number in the BGP information in FIG. 2A as a key (S425). Retrieved prefixes are destination prefixes if a destination BGP peer is designated by the user, or are source prefixes if a source BGP peer is designated by the user (S425). The process after this point is similar to that in the case where a source and/or destination prefix is designated; and the process enters the loop (after S440) to perform steps S450 to S480 on all the border routers, for all the retrieved prefixes.

As a concrete example, a case will be described in accordance with a display example in FIG. 10, where a user specifies that a destination BGP peer AS number is AS2. By searching the BGP information in FIG. 2A for a prefix whose peer AS number is AS2, X and Y are obtained. Therefore, by acquiring traffic amounts corresponding to the destination prefixes X and Y from the NetFlow/sFlow information in FIGS. 3A to 3C, 10 Mbps and 20 Mbps are obtained, respectively, for the router A, and 10 Mbps and 59 Mbps are obtained, respectively, for the router E. Referring to the BGP information in FIG. 2A on the routers A and E, the router D is obtained as a next router to the destination prefixes X and Y, so a path from the router A to D and a path from the router E to D are severally calculated using the OSPF topology information in FIG. 2B so as to be displayed with the path-by-path total of the above traffic amounts.

FIG. 11 shows an exemplary process performed by the information presentation apparatus 100 in a case where a link or router belonging to the home AS is designated by a user. To begin with, the OSPF topology information in FIG. 2B is searched for a path that passes through the designated link or router, and a list of [start router, end router, path] is acquired (S1110). Then, the following process is performed on all the start routers (border routers) in the list (steps after S1120 are repeated via S1165 until the answer of S1160, in which whether the process is done for all the start routers or not is asked, becomes Yes).

First, the BGP information in FIG. 2A on a list of [start router (R), end router (NR)] to be processed is searched for a matching entry, and a corresponding prefix is obtained (S1130). Then, traffic information on the retrieved destination prefix is acquired from the NetFlow/sFlow information in FIGS. 3A to 3C (S1140). Then, [star router (R), end router (NR), path] to be processed is displayed in association with the obtained traffic amount (S1150).

Figure 12:
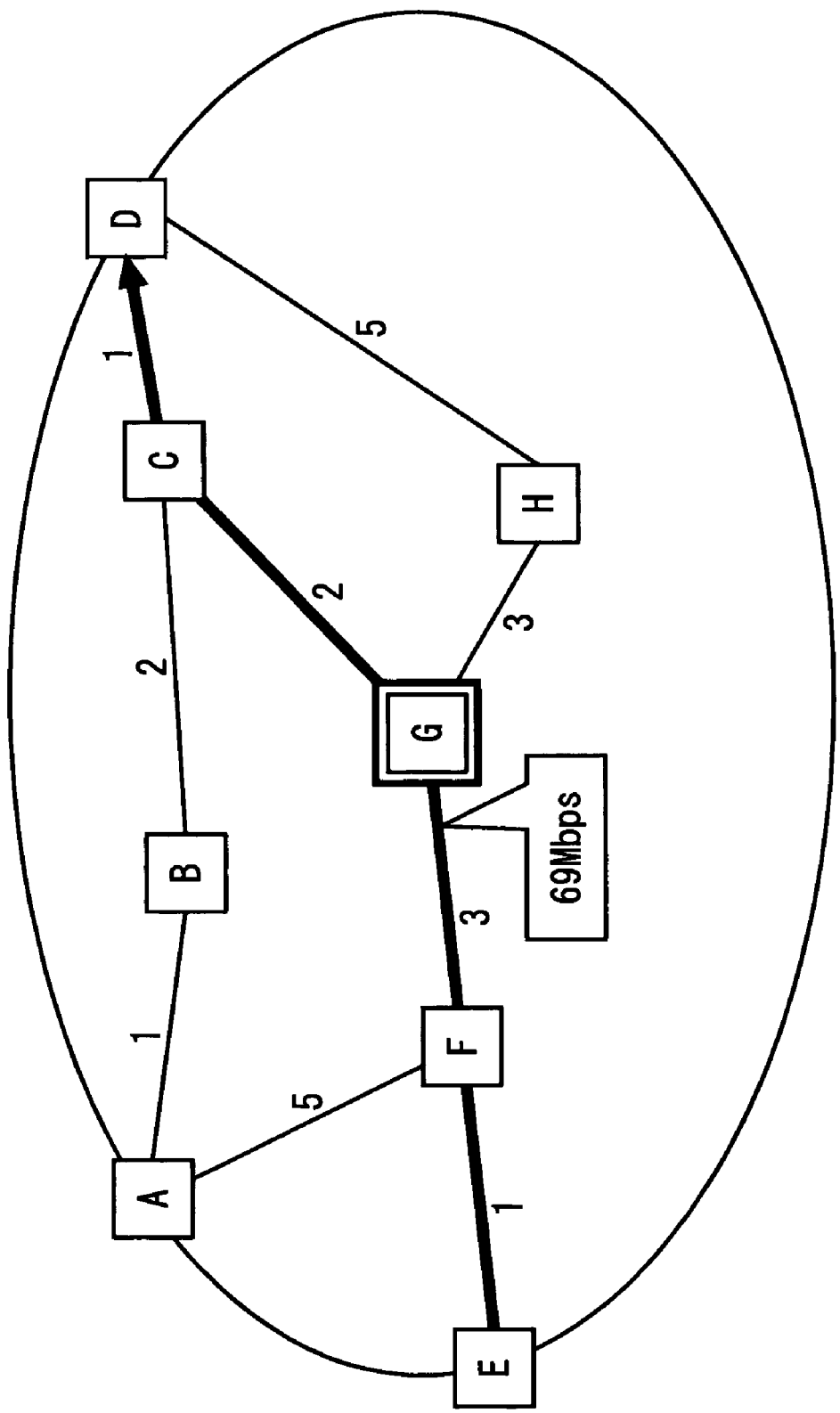
FIG. 12 shows an example of information shown to a user by the information presentation apparatus in a case where a link or a router is designated.

As a concrete example, a case will be described in accordance with a display example in FIG. 12, where a user specifies traffic as passing through the router G. First, by searching the OSPF topology information in FIG. 2B for a path that passes through the designated router G, a [start router, end router, path] list describing [E, D, from E through F through G through C to D] is obtained, so the BGP information in FIG. 2A on the router E is searched for a prefix whose next router is D. Prefixes X and Y are then obtained, so the NetFlow/sFlow information in FIG. 3B on the router E is searched for traffic information whose destination prefix is X and for traffic information whose destination prefix is Y. Since these pieces of traffic information are for the same path (from E through F through G through C to D), the traffic amounts are added up, so that 39+20+10=69 Mbps is obtained. The path and the obtained traffic amount are graphically displayed.

In the above example, there is one path that passes through G determined from the OSPF topology information. But, if a plurality of paths are determined, the [start router, end router, path] process can be performed for each path so that all the paths are displayed. In addition, designation of a router is taken as an example in this example, but the search and display can be performed as well in a case where a link is designated, for example, in such a manner that a link between the router F and the router G is designated.

The above examples describe that a user can specify variously. In any case described above, a start router can be additionally designated. When a user designates a certain start router, the process to be performed on all the border routers (S450 to S480 in FIG. 4, S930 to S960 in FIG. 9, and S1130 to S1150 in FIG. 11) will be performed only on the certain start router. For example, in the example of designating an AS number in FIG. 5, if a user designates E as a start router, only traffic and path from the router E are retrieved and displayed.

The above examples describe cases where a path display is performed for one-way traffic that comes in from a start router and is sent out of an end router. Additionally, a path and traffic amount in the reverse direction, in which a start router and an end router are reversed, can be determined as well to display information on both directions at a time. In a case where a user designates a prefix or AS number, paths and traffic amounts can also be determined and displayed for both of traffic whose destination is the designated prefix or AS number and traffic whose source is the designated prefix or AS number.

A border router may not be a BGP speaker in a case where the network 300 or 310 is a user network. Even in such a case, information similar to FIG. 2A can be obtained for a border router (start router) that is not a BGP speaker, by combining IGP information and EGP information, so that information can be shown to a user in a similar manner as the above-described examples.

By using the above-described configuration, for example, an ISP manager can make instructions from various viewpoints to visually check an overall state of traffic and paths in the manager's own ISP network (home network) with a bird's-eye view. Therefore, based on the results, the manager can set up routing that allows more effective use of resources (routers and links) in the home ISP network, or can set up a private peer between the home ISP network and another ISP network. In this way, the manager becomes able to do various network designs and operations in order to control communication quality provided by the home ISP network.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. An apparatus for visualizing traffic in a network to be managed, comprising:
    a traffic acquiring unit that acquires traffic information regarding a traffic specified in accordance with an instruction from a user, the traffic passing through a series of one or more routers inside the network and the traffic information being collected from one or more border routers located at a border of the network;
    a path acquiring unit that acquires path information regarding a path from a start router, through which the traffic passes into the network, to an end router, through which the traffic passes out of the network, based on information regarding internal paths in the network, the path information identifying said series of one or more routers on the path;
    a controlling unit that controls at least one of specification of the traffic and determination of the end router based on information regarding external paths of the network; and
    an informing unit that gives information to the user based on the traffic information acquired by the traffic acquiring unit and the path information acquired by the path acquiring unit, the information associating the specified traffic with the path through which the specified traffic passes from the start router to the end router.

2. An apparatus for visualizing traffic in a network to be managed, comprising:
    a specifying unit that determines specification information for specifying a traffic in accordance with an instruction from a user;
    a traffic acquiring unit that acquires traffic information regarding the traffic specified by the specification information, the traffic passing through a series of one or more routers inside the network and the traffic information being collected from one or more border routers located at a border of the network;
    a determining unit that determines a start router, through which the traffic passes into the network, and an end router, through which the traffic passes out of the network;
    a path acquiring unit that acquires path information regarding an internal path of the network from the start router to the end router, the path information identifying said series of one or more routers on the internal path; and
    an informing unit that gives information to the user based on the traffic information acquired by the traffic acquiring unit and the path information acquired by the path acquiring unit, the information associating the specified traffic with the internal path through which the specified traffic passes from the start router to the end router.

3. The apparatus according to claim 2, wherein
    the specification information includes at least one of a destination network address and a source network address of the traffic, and
    the determining unit determines that a router from which traffic information regarding the traffic specified by the specification information is collected is the start router, and determines the end router based on the destination network address of the traffic.

4. The apparatus according to claim 2, further comprising
    a storing unit that stores external information regarding external paths of the network,
    and wherein
    the determining unit determines the end router based on a destination network address of the traffic, referring to the external information stored by the storing unit.

5. The apparatus according to claim 2, further comprising
    a storing unit that stores external information regarding external paths of the network,
    and wherein
    the specifying unit includes a unit that determines one or more destination or source network addresses based on a destination or source network management number designated by the user, referring to the external information stored by the storing unit.

6. The apparatus according to claim 2, further comprising a storing unit that stores external information regarding external paths of the network, and wherein the specifying unit includes a unit that determines one or more network addresses based on a peer network management number designated by the user, referring to the external information stored by the storing unit.

7. The apparatus according to claim 2, wherein the specifying unit includes a unit that determines an end router in accordance with the user's instruction, and determines, as the specification information, a destination network address corresponding to the end router, the destination network address being registered by said one or more routers, and the determining unit determines that a router which registers the destination network address determined as the specification information is the start router, and determines that the end router determined by the specifying unit is the end router.

8. The apparatus according to claim 2, further comprising a storing unit that stores external information regarding external paths of the network, and wherein the specifying unit includes a unit that determines a destination network address corresponding to the end router, referring to the external information stored by the storing unit.

9. The apparatus according to claim 2, further comprising a storing unit that stores internal information regarding internal paths of the network, and wherein the specifying unit includes a unit that determines an end router such that a router having an address designated by the user as the router's connected address is the end router, referring to the internal information stored by the storing unit.

10. The apparatus according to claim 2, further comprising a storing unit that stores internal information regarding internal paths of the network, and wherein the path acquiring unit acquires the path information regarding a path from the start router to the end router, referring to the internal information stored by the storing unit.

11. The apparatus according to claim 2, further comprising an accepting unit that accepts designation of a start router from the user, and wherein the traffic acquiring unit acquires the traffic information by collecting the traffic information from the start router designated via the accepting unit by the user, and the determining unit determines the start router in accordance with the user's designation via the accepting unit.

12. An apparatus for visualizing traffic in a network to be managed, comprising:

a path acquiring unit that acquires path information regarding at least one path passing through a router or a link between routers designated by a user inside the network, the path information identifying a series of one or more routers on each of said at least one path;

a determining unit that determines a start router and an end router for each of said at least one path, the start router and the end router being located at a border of the network;

a specifying unit that determines specification information for specifying a traffic based on the end router determined by the determining unit;

a traffic acquiring unit that acquires traffic information regarding the traffic specified by the specification information, the traffic passing through said series of one or more routers inside the network and the traffic information being collected from the start router determined by the determining unit; and an informing unit that gives information to the user based on the traffic information acquired by the traffic acquiring unit and the path information acquired by the path acquiring unit, the information associating the specified traffic with a path through which the specified traffic passes from the start router to the end router.

13. The apparatus according to claim 12, further comprising a storing unit that stores internal information regarding internal paths of the network, and wherein the path acquiring unit acquires the path information, referring to the internal information stored by the storing unit, and the determining unit determines the start router and the end router, referring to the internal information stored by the storing unit.

14. The apparatus according to claim 12, further comprising a storing unit that stores external information regarding external paths of the network, and wherein the specifying unit determines, as the specification information, a destination network address corresponding to the end router, referring to the external information stored by the storing unit, the destination network address being registered by the start router.

15. The apparatus according to claim 12, further comprising an accepting unit that accepts designation of a start router from the user, and wherein the traffic acquiring unit acquires the traffic information by collecting the traffic information from the start router designated via the accepting unit by the user, and the determining unit determines the start router in accordance with the user's designation via the accepting unit.

16. A method of visualizing traffic in a network to be managed, comprising:

determining specification information for specifying a traffic in accordance with an instruction from a user;

acquiring traffic information regarding the traffic specified by the specification information, the traffic passing through a series of one or more routers inside the network and the traffic information being collected from one or more border routers located at a border of the network;

determining a start router, through which the traffic passes into the network, and an end router, through which the traffic passes out of the network;

acquiring path information regarding an internal path of the network from the start router to the end router, the path information identifying said series of one or more routers on the internal path; and giving information to the user based on the traffic information and the path information, the information associating the specified traffic with the internal path through which the specified traffic passes from the start router to the end router.

17. A method of visualizing traffic in a network to be managed, comprising:
   determining an end router in accordance with an instruction from a user;
   determining specification information for specifying a traffic, the specification information being registered corresponding to the end router by one or more border routers located at a border of the network;
   acquiring traffic information regarding the traffic specified by the specification information, the traffic passing through a series of one or more routers inside the network and the traffic information being collected from said one or more border routers;
   acquiring path information regarding an internal path of the network from a start router to the end router, the start router being said one or more border routers, the path information identifying said series of one or more routers on the internal path; and
   giving information to the user based on the traffic information and the path information, the information associating the specified traffic with the internal path through which the specified traffic passes from the start router to the end router.

18. A method of visualizing traffic in a network to be managed, comprising:
   acquiring path information regarding at least one path passing through a router or a link between routers designated by a user inside the network, the path information identifying a series of one or more routers on each of said at least one path;
   determining a start router and an end router for each of said at least one path, the start router and the end router being located at a border of the network;
   determining specification information for specifying a traffic based on the end router;
   acquiring traffic information regarding the traffic specified by the specification information, the traffic passing through said series of one or more routers inside the network and the traffic information being collected from the start router; and
   giving information to the user based on the traffic information and the path information, the information associating the specified traffic with a path through which the specified traffic passes from the start router to the end router.

19. A computer usable medium having computer readable program codes embodied therein for a computer functioning as an apparatus for visualizing traffic in a network to be managed, the computer readable program codes comprising:
   a traffic acquiring code module causing the computer to acquire traffic information regarding a traffic specified in accordance with an instruction from a user, the traffic passing through a series of one or more routers inside the network and the traffic information being collected from one or more border routers located at a border of the network;
   a path acquiring code module causing the computer to acquire path information regarding a path from a start router, through which the traffic passes into the network, to an end router, through which the traffic passes out of the network, based on information regarding internal paths in the network, the path information identifying said series of one or more routers on the path;
   a controlling code module causing the computer to control at least one of specification of the traffic and determination of the end router based on information regarding external paths of the network; and
   an informing code module causing the computer to give information to the user based on the traffic information acquired by the traffic acquiring code module and the path information acquired by the path acquiring code module, the information associating the specified traffic with the path through which the specified traffic passes from the start router to the end router.

20. The computer usable medium of claim 19, wherein the network to be managed is at least one of a plurality of autonomous systems, each one of the autonomous systems including a plurality of routers inside.

* * * * *